Patented May 7, 1929.

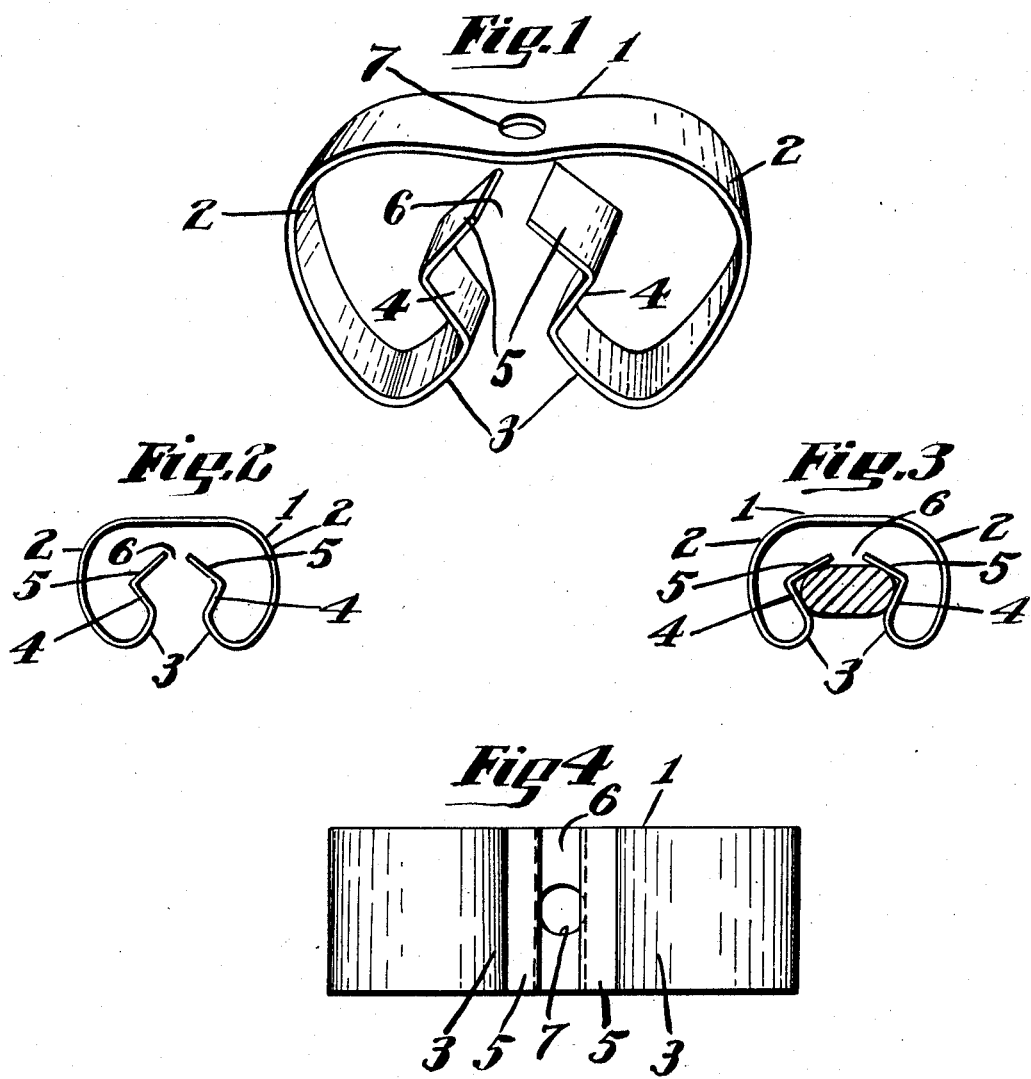

UNITED STATES PATENT OFFICE.

FRANCIS W. GIBSON, OF WEST ROXBURY, MASSACHUSETTS.

SPRING CLIP.

Application filed November 9, 1927. Serial No. 232,160.

The ordinary spring clip adapted to be fastened to a wall or other support and shaped to receive articles placed vertically therethrough, such as brushes, rubber stamps and the like, is open to the objection that when once deformed it cannot be restored to original condition. This is due to the construction of the clip itself. Such a clip consists of a strip of spring metal which is bent upon itself to provide an intermediate attaching portion, and the extensions of said attaching portion are first bent inwardly and thence outwardly relative to each other, providing reversely bent bows which furnish the spring grip and are then bent to provide a recess within which the article to be gripped is inserted. Inasmuch as the reverse bends of the spring bows furnish the spring grip, it results that if such bows are once deformed, the clip not only loses its gripping action, but such action cannot be restored.

In my analysis of the problem, I have concluded that the reverse bending of the bows is the factor which makes the clip so susceptible to deformation, in that such reverse bending lends itself to deformation, rather than prevents it. I have therefore sought to provide a clip which will not be readily deformable and in accomplishing this result I have eliminated the reverse bending of the bows. This results in a clip in which each bow is continuously curved in the same direction so that the clamping action exerted by the bows is an equal opposite action.

In the accompanying drawing I have shown a clamp constructed in accordance with the principles of my invention. Referring to this drawing:

Fig. 1 is a perspective view of such a clip.

Figs. 2 and 3 are plan views thereof, showing the two positions of the clip, and Fig. 4 is a front elevation.

My clip is of one-piece construction and consists of a ribbon or strip of spring metal which is bent upon itself to provide an intermediate attaching portion 1. From the attaching portion 1, the clip extends as a pair of continuously curving symmetrically disposed bows 2, which provide equal opposite spring clamping effect. These bows extend as oppositely disposed arcs of a circle having a common center C. At their lower portions they are turned upwardly and inwardly, as indicated at 3, and from thence are bent outwardly as at 4 and inwardly again as at 5 to provide a generally square shaped recess 6, adapted to receive the handle of the brush or other object which is inserted vertically thereinto.

If desired, the attaching portion 1 may be pierced at 7 for the reception of a screw, by means of which a clip may be fastened to a wall or other support.

The upwardly and inwardly curving guide portions 3 facilitate the entrance of the article to be supported into the recess 6. In such entrance, the article spreads the portions 4 and 5 apart (Fig. 3), but this spreading action is yieldingly resisted by the curved bows 2, which thus exert opposite spring clamping effect on the article. Inasmuch as the curve of the bows is continuously inwardly instead of being reversed, the tendency of the clip to become permanently deformed is lessened to such a degree as to make deformation practically impossible.

Various modifications in the form and construction of my device may obviously be resorted to, all without departing from the spirit of my invention, if within the limits of the appended claim.

What I therefore claim and desire to secure by Letters Patent is:

A spring clip of the class described, comprising a strip of sheet material bent upon itself to provide a relatively straight attaching portion and beyond said attaching portion extending as a pair of spaced arcuate bows continuously curved towards each other from opposite directions and presenting spaced converging article guiding portions and beyond said guiding portions being bent outwardly and thence inwardly to provide article gripping jaws defining with each other an open-ended generally square recess disposed within the arcs on which said bows are generated and within which recess the article to be gripped is lodged after passing said guiding portions.

In testimony whereof I affix my signature.

FRANCIS W. GIBSON.